United States Patent
Saito

(10) Patent No.: US 7,383,447 B2
(45) Date of Patent: *Jun. 3, 2008

(54) METHOD FOR CONTROLLING DATABASE COPYRIGHTS

(75) Inventor: Makoto Saito, Tokyo (JP)

(73) Assignee: Intarsia Software LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/190,177

(22) Filed: Jul. 25, 2005

(65) Prior Publication Data

US 2005/0262023 A1    Nov. 24, 2005

Related U.S. Application Data

(63) Continuation of application No. 09/544,497, filed on Apr. 7, 2000, now Pat. No. 7,036,019, which is a continuation of application No. 08/895,493, filed on Jul. 16, 1997, which is a continuation of application No. 08/416,037, filed on Mar. 31, 1995, now abandoned.

(30) Foreign Application Priority Data

Apr. 1, 1994    (JP)    ................. 6-64889

(51) Int. Cl.
  *H04L 9/32*    (2006.01)
  *H04L 9/00*    (2006.01)
(52) U.S. Cl. .............. 713/193; 713/189; 380/277; 726/26
(58) Field of Classification Search ............ 713/180, 713/155, 193, 189; 380/47, 51, 259, 277, 380/280, 281, 201, 203; 705/57–59, 62, 705/51; 726/26–31, 33, 34
See application file for complete search history.

(56) References Cited

U.S. PATENT DOCUMENTS

| | | | |
|---|---|---|---|
| 4,104,721 | A | 8/1978 | Markstein et al. |
| 4,168,396 | A | 9/1979 | Best |
| 4,225,884 | A | 9/1980 | Block et al. |
| 4,278,337 | A | 7/1981 | Mashimo |
| 4,278,837 | A | 7/1981 | Best |
| 4,352,952 | A | 10/1982 | Boone et al. |
| 4,386,233 | A | 5/1983 | Smid et al. |
| 4,423,287 | A | 12/1983 | Zeidler |
| 4,465,901 | A | 8/1984 | Best |

(Continued)

FOREIGN PATENT DOCUMENTS

DE    3717261    11/1987

(Continued)

OTHER PUBLICATIONS

Research Disclosure No. 335, Mar. 1992, Emsworth GB, p. 219 XP 000301128 "Encryption of Information to be Recorded so as to Prevent Unauthorized Playback".

(Continued)

*Primary Examiner*—Hosuk Song

(57) ABSTRACT

A method and apparatus for controlling digital data management includes encrypting digital data to produce encrypted digital data supplied to a user, and using a utilization permit key pre-defined to permit at least one of displaying, editing, storing, copying, and transferring of said digital data.

50 Claims, 4 Drawing Sheets

U.S. PATENT DOCUMENTS

| | | |
|---|---|---|
| 4,527,195 A | 7/1985 | Cheung |
| 4,558,176 A | 12/1985 | Arnold et al. |
| 4,567,512 A | 1/1986 | Abraham |
| 4,588,991 A | 5/1986 | Atalla |
| 4,613,901 A | 9/1986 | Gilhousen et al. |
| 4,623,918 A | 11/1986 | Chomet |
| 4,709,266 A | 11/1987 | Hanas et al. |
| 4,710,955 A | 12/1987 | Kauffman |
| 4,736,422 A | 4/1988 | Mason |
| 4,751,732 A | 6/1988 | Kamitake |
| 4,757,534 A | 7/1988 | Matyas et al. |
| 4,759,062 A | 7/1988 | Traub et al. |
| 4,791,565 A | 12/1988 | Dunham |
| 4,799,156 A | 1/1989 | Shavit et al. |
| 4,827,508 A | 5/1989 | Shear |
| 4,829,569 A | 5/1989 | Seth-Smith et al. |
| 4,850,017 A | 7/1989 | Matyas et al. |
| 4,852,154 A | 7/1989 | Lewis et al. |
| 4,862,268 A | 8/1989 | Campbell et al. |
| 4,864,494 A | 9/1989 | Kobus, Jr. |
| 4,864,614 A | 9/1989 | Crowther |
| 4,864,615 A | 9/1989 | Bennett et al. |
| 4,890,319 A | 12/1989 | Seth-Smith et al. |
| 4,890,321 A | 12/1989 | Seth-Smith et al. |
| 4,905,277 A | 2/1990 | Nakamura |
| RE33,189 E | 3/1990 | Lee et al. |
| 4,916,737 A | 4/1990 | Chomet et al. |
| 4,919,545 A | 4/1990 | Yu |
| 4,977,594 A | 12/1990 | Shear |
| 4,995,080 A | 2/1991 | Bestler et al. |
| 5,008,853 A | 4/1991 | Bly et al. |
| 5,029,207 A | 7/1991 | Gammie |
| 5,036,461 A | 7/1991 | Elliott et al. |
| 5,046,093 A | 9/1991 | Wachob |
| 5,060,262 A | 10/1991 | Bevins, Jr et al. |
| 5,077,665 A | 12/1991 | Silverman et al. |
| 5,083,309 A | 1/1992 | Beysson |
| 5,091,938 A | 2/1992 | Thompson et al. |
| 5,126,566 A | 6/1992 | Shimada |
| 5,138,659 A | 8/1992 | Kelkar et al. |
| 5,142,579 A | 8/1992 | Anderson |
| 5,144,663 A | 9/1992 | Kudelski et al. |
| 5,146,497 A | 9/1992 | Bright |
| 5,163,096 A * | 11/1992 | Clark et al. ............... 711/164 |
| 5,173,939 A | 12/1992 | Abadi et al. |
| 5,204,961 A | 4/1993 | Barlow |
| 5,220,604 A | 6/1993 | Gasser et al. |
| 5,224,163 A | 6/1993 | Gasser et al. |
| 5,227,893 A | 7/1993 | Ett |
| 5,235,641 A | 8/1993 | Nozawa et al. |
| 5,247,575 A | 9/1993 | Sprague et al. |
| 5,270,773 A | 12/1993 | Sklut |
| 5,291,598 A | 3/1994 | Grundy |
| 5,301,245 A | 4/1994 | Endoh |
| 5,315,657 A | 5/1994 | Abadi et al. |
| 5,319,705 A | 6/1994 | Halter et al. |
| 5,323,464 A | 6/1994 | Elander et al. |
| 5,341,425 A | 8/1994 | Wasilewski et al. |
| 5,345,508 A | 9/1994 | Lynn et al. |
| 5,347,581 A | 9/1994 | Naccache et al. |
| 5,349,662 A | 9/1994 | Johnson et al. |
| 5,353,351 A | 10/1994 | Bartoli et al. |
| 5,369,702 A | 11/1994 | Shanton |
| 5,381,480 A | 1/1995 | Butter et al. |
| 5,392,351 A | 2/1995 | Hasebe et al. |
| 5,400,403 A | 3/1995 | Fahn et al. |
| 5,410,602 A | 4/1995 | Finkelstein et al. |
| 5,414,772 A | 5/1995 | Naccache et al. |
| 5,428,606 A | 6/1995 | Moskowitz |
| 5,428,685 A | 6/1995 | Kadooka |
| 5,438,508 A | 8/1995 | Wyman |
| 5,442,706 A | 8/1995 | Kung |
| 5,444,779 A | 8/1995 | Daniele et al. |
| 5,444,782 A | 8/1995 | Adams, Jr. et al. |
| 5,450,493 A | 9/1995 | Maher |
| 5,453,601 A | 9/1995 | Rosen |
| 5,455,863 A | 10/1995 | Brown et al. |
| 5,455,941 A | 10/1995 | Okuno et al. |
| 5,457,746 A | 10/1995 | Dolphin |
| 5,465,299 A | 11/1995 | Matsumoto et al. |
| 5,475,757 A | 12/1995 | Kelly |
| 5,475,758 A | 12/1995 | Kikuchi |
| 5,479,514 A | 12/1995 | Klonowski |
| 5,485,577 A | 1/1996 | Eyer et al. |
| 5,495,533 A | 2/1996 | Linehan et al. |
| 5,497,420 A | 3/1996 | Garneau et al. |
| 5,499,340 A | 3/1996 | Barritz |
| 5,504,816 A | 4/1996 | Hamilton et al. |
| 5,504,817 A | 4/1996 | Shamir |
| 5,504,818 A | 4/1996 | Okano |
| 5,504,933 A | 4/1996 | Saito |
| 5,509,073 A | 4/1996 | Monnin |
| 5,509,074 A | 4/1996 | Choudhury et al. |
| 5,511,121 A | 4/1996 | Yacobi |
| 5,515,441 A | 5/1996 | Faucher |
| 5,515,538 A | 5/1996 | Kleiman |
| 5,532,920 A | 7/1996 | Hartrick et al. |
| 5,541,994 A | 7/1996 | Tomko et al. |
| 5,553,145 A | 9/1996 | Micali |
| 5,577,121 A | 11/1996 | Davis et al. |
| 5,579,223 A | 11/1996 | Ramon |
| 5,581,682 A | 12/1996 | Anderson et al. |
| 5,584,023 A | 12/1996 | Hsu |
| 5,604,800 A | 2/1997 | Johnson et al. |
| 5,606,609 A | 2/1997 | Houser et al. |
| 5,606,613 A | 2/1997 | Lee et al. |
| 5,633,934 A | 5/1997 | Hember |
| 5,636,277 A | 6/1997 | Nagahama |
| 5,642,418 A | 6/1997 | Farris et al. |
| 5,646,997 A | 7/1997 | Barton |
| 5,646,999 A | 7/1997 | Saito |
| 5,651,064 A | 7/1997 | Newell |
| 5,666,411 A | 9/1997 | McCarty |
| 5,680,452 A | 10/1997 | Shanton |
| 5,689,587 A | 11/1997 | Bender et al. |
| 5,706,210 A | 1/1998 | Kumano et al. |
| 5,715,393 A | 2/1998 | Naugle |
| 5,740,246 A | 4/1998 | Saito |
| 5,745,572 A | 4/1998 | Press |
| 5,765,152 A | 6/1998 | Erickson et al. |
| 5,765,176 A | 6/1998 | Bloomberg |
| 5,771,383 A | 6/1998 | Magee et al. |
| 5,794,115 A | 8/1998 | Saito |
| 5,812,762 A | 9/1998 | Kim |
| 5,818,933 A | 10/1998 | Kambe et al. |
| 5,825,892 A | 10/1998 | Braudaway |
| 5,832,083 A | 11/1998 | Iwayama et al. |
| 5,835,601 A | 11/1998 | Shimbo et al. |
| 5,835,765 A | 11/1998 | Matsumoto |
| 5,841,886 A | 11/1998 | Rhoads |
| 5,848,155 A | 12/1998 | Cox |
| 5,848,158 A | 12/1998 | Saito |
| 5,864,683 A | 1/1999 | Boebert et al. |
| 5,867,579 A | 2/1999 | Saito |
| 5,889,868 A | 3/1999 | Moskowitz |
| 5,901,339 A | 5/1999 | Saito |
| 5,910,987 A | 6/1999 | Ginter et al. |
| 5,912,969 A | 6/1999 | Sasamoto et al. |
| 5,968,175 A | 10/1999 | Morishita et al. |
| 5,974,141 A | 10/1999 | Saito |
| 5,982,891 A | 11/1999 | Ginter |
| 5,986,690 A | 11/1999 | Hendricks |
| 6,002,772 A | 12/1999 | Saito |
| 6,006,328 A | 12/1999 | Drake |

| | | |
|---|---|---|
| 6,026,430 A | 2/2000 | Butman et al. |
| 6,044,367 A | 3/2000 | Wolff |
| 6,069,952 A | 5/2000 | Saito et al. |
| 6,076,077 A | 6/2000 | Saito |
| 6,081,794 A | 6/2000 | Saito |
| 6,091,835 A | 7/2000 | Smithies et al. |
| 6,097,816 A | 8/2000 | Saito |
| 6,097,818 A | 8/2000 | Saito |
| 6,128,605 A | 10/2000 | Saito et al. |
| 6,160,891 A | 12/2000 | Al-Salqan |
| 6,182,218 B1 | 1/2001 | Saito |
| 6,209,092 B1 | 3/2001 | Linnartz |
| 6,226,618 B1 | 5/2001 | Downs et al. |
| 6,272,635 B1 | 8/2001 | Saito |
| 6,408,390 B1 | 6/2002 | Saito |
| 6,415,271 B1 | 7/2002 | Turk et al. |
| 6,424,715 B1 | 7/2002 | Saito |
| 6,438,694 B2 | 8/2002 | Saito |
| 6,449,717 B1 | 9/2002 | Saito |
| 6,463,536 B2 | 10/2002 | Saito |
| 6,519,623 B1 | 2/2003 | Mancisidor |
| 6,560,339 B1 | 5/2003 | Iwamura |
| 6,574,609 B1 | 6/2003 | Downs et al. |
| 6,603,864 B1 | 8/2003 | Matsunoshita |
| 6,615,258 B1 | 9/2003 | Barry et al. |
| 6,668,324 B1 | 12/2003 | Mangold et al. |
| 6,721,887 B2 | 4/2004 | Saito |
| 6,741,991 B2 | 5/2004 | Saito |
| 6,744,894 B1 | 6/2004 | Saito |
| 6,789,197 B1 | 9/2004 | Saito |
| 6,851,053 B1 | 2/2005 | Liles et al. |
| 6,874,089 B2 | 3/2005 | Dick et al. |
| 7,024,681 B1 | 4/2006 | Fransman et al. |
| 7,036,019 B1 | 4/2006 | Saito |
| 7,093,295 B1 | 8/2006 | Saito |
| 2002/0021807 A1 | 2/2002 | Saito |
| 2002/0052850 A1 | 5/2002 | Saito |
| 2002/0112173 A1 | 8/2002 | Saito |
| 2003/0144963 A1 | 7/2003 | Saito |
| 2005/0262023 A1 | 11/2005 | Saito |

FOREIGN PATENT DOCUMENTS

| | | |
|---|---|---|
| EP | 0121953 | 10/1984 |
| EP | 158167 | 10/1985 |
| EP | 0199410 | 10/1986 |
| EP | 0341801 | 11/1989 |
| EP | 0391261 A3 | 3/1990 |
| EP | 0 398 645 EC | 11/1990 |
| EP | 0459046 | 12/1991 |
| EP | 0542298 A3 | 11/1992 |
| EP | 0 518 365 A2 | 12/1992 |
| EP | 0191162 B1 | 2/1993 |
| EP | 0532381 | 3/1993 |
| EP | 0551016 | 7/1993 |
| EP | 0561685 | 9/1993 |
| EP | 0 581 227 EC | 2/1994 |
| EP | 0 590 763 EC | 4/1994 |
| EP | 0590763 | 4/1994 |
| EP | 0421808 B1 | 12/1994 |
| EP | 0 649 074 EC | 4/1995 |
| EP | 0649074 | 4/1995 |
| EP | 0665486 | 8/1995 |
| EP | 0430734 B1 | 9/1995 |
| EP | 0354774 B1 | 4/1996 |
| EP | 0715243 | 6/1996 |
| EP | 0450841 B1 | 8/1996 |
| EP | 0506435 B1 | 10/1996 |
| EP | 0489385 B1 | 3/1997 |
| EP | 0438154 B1 | 7/1997 |
| EP | 0398645 B1 | 8/1997 |
| EP | 0813133 A2 | 12/1997 |
| EP | 0677949 B1 | 5/2003 |
| EP | 0719045 B1 | 10/2003 |
| EP | 0704785 B1 | 11/2003 |
| EP | 0715241 B1 | 1/2004 |
| EP | 0746126 B1 | 12/2004 |
| EP | 0581227 B1 | 9/2005 |
| EP | 0709760 B1 | 5/2006 |
| GB | 2231244 | 11/1990 |
| JP | 59169000 | 9/1984 |
| JP | 60102038 | 6/1985 |
| JP | 62-168540 | 7/1987 |
| JP | 64-041387 | 2/1989 |
| JP | 64-061782 | 8/1989 |
| JP | 3128541 | 5/1991 |
| JP | 3265241 | 11/1991 |
| JP | 03-282989 | 12/1991 |
| JP | 4181282 | 6/1992 |
| JP | 4268844 | 9/1992 |
| JP | 5056037 | 3/1993 |
| JP | 5063142 | 3/1993 |
| JP | 5075597 | 3/1993 |
| JP | 05-122701 | 5/1993 |
| JP | 5276476 | 10/1993 |
| JP | 05-298373 | 11/1993 |
| JP | 5316102 | 11/1993 |
| JP | 5324936 | 12/1993 |
| JP | 5327693 | 12/1993 |
| JP | 5334324 | 12/1993 |
| JP | 6095591 | 4/1994 |
| JP | 6131806 | 5/1994 |
| JP | 6231536 | 8/1994 |
| JP | 6236147 | 8/1994 |
| JP | 6242304 | 9/1994 |
| JP | 6264199 | 9/1994 |
| JP | 6264201 | 9/1994 |
| JP | 6269959 | 9/1994 |
| JP | 6290087 | 10/1994 |
| JP | 6318036 | 11/1994 |
| JP | 7014045 | 1/1995 |
| JP | 7271865 | 10/1995 |
| JP | 7302244 | 11/1995 |
| JP | 8185448 | 7/1996 |
| JP | 8292976 | 11/1996 |
| WO | WO8503830 | 8/1985 |
| WO | WO8909528 | 10/1989 |
| WO | WO 9002382 | 3/1990 |
| WO | WO9307715 | 4/1993 |
| WO | WO 9520291 | 7/1995 |
| WO | WO9612113 | 5/1996 |
| WO | WO9623257 | 8/1996 |
| WO | WO9627259 | 9/1996 |
| WO | WO9750036 | 12/1997 |

OTHER PUBLICATIONS

Gale, B. and Baylin, F., Scrambling and Descrambling, Satellite and Cable TV 2nd Ed, Baylin/Gale Productions 1986 Boulder CO; pp. 163-165.
Search Report dated Oct. 24, 2002.
U.S. Appl. No. 11/556,992, filed Nov. 6, 2006, Saito.
U.S. Appl. No. 11/469,035, filed Aug. 31, 2006, Saito.
U.S. Appl. No. 11/512,885, filed Aug. 29, 2006, Saito.
U.S. Appl. No. 11/512,695, filed Aug. 29, 2006, Saito.
U.S. Appl. No. 11/496,777, filed Jul. 31, 2006, Saito.
U.S. Appl. No. 11/491,400, filed Jul. 20, 2006, Saito.
U.S. Appl. No. 11/480,690, filed Jul. 3, 2006, Saito.
U.S. Appl. No. 11/446,604, filed Jun. 1, 2006, Saito.
U.S. Appl. No. 11/441,973, filed May 25, 2006, Saito.
U.S. Appl. No. 11/404,124, filed Apr. 12, 2006, Saito.
Memon, Nasir, et al., "Protecting Digital Media Content" Association for Computing Machinery, Communications of the ACM, New York, Jul. 1998, vol. 41, issue 7, pp. 35-43.

Murphy, Kathleen, "Digimarc Awarded patent for Digital Watermarking" Business, Mar. 10, 1998, www.internetnews.com/bus-news/artical.php/19611, 2 pgs.

Hedberg, S.R. "HP's International Cryptography Framework: Compromise of Threat?" IEEE Computer, Jan. 1997, pp. 28-30.

Zhang, N.X. "Secure Code Distribution" IEEE Computer, Jun. 1997, pp. 76-79.

Anonymos, "Security" Government Exacutive, National Journal, Inc. Washington, vol. 29, issue 1, Jan. 1997, pp. 35-37.

Wayner, P. "Digital Copyright Protection" AP Professional, 1997, pp. 1-7 and 14-17.

U.S. Appl. No. 10/170,677, filed Jun. 13, 2002, Saito.

U.S. Appl. No. 10/013,507, filed Dec. 13, 2001, Saito.

U.S. Appl. No. 09/985,279, filed Nov. 2, 2001, Saito.

Menezes, Alfred, et al., "Handbook of Applied Cryptography" 1997, sec. 11.5.1, CRC Press, pp. 452-454.

Fitch, K. "User Authentication and Software Distribution on the Web", ausweb97@scu.edu.au Nov. 5, 1996, pp. 1-12.

Rubin, A.D., "Trusted Distribution of Software Over the Internet" Network and Distributed System Security, Feb. 16-17, 1995, San Diego, California, pp. 47-53.

U.S. Appl. No. 09/665,902, filed Sep. 20, 2000, Saito.

Bryan, John "A look at five different firewall products and services you can install today" www.byte.com/art/9504/sec10/art6.htm, Apr. 1995.

Rubin, A.D., "Secure Distribution of Electronic Documents in an Hostile Environment" Computer Communications, vol. 18, No. 6, Jun. 1995, pp. 429-434.

Bellovin, S.M. et al., "Network Firewalls" IEEE Communications Magazine, vol. 32, No. 9, Oct. 1994, pp. 50-57.

U.S. Appl. No. 09/476,334, filed Jan. 30, 2000, Saito

U.S. Appl. No. 09/362,955, filed Jul. 30, 1999, Saito.

Rozenblit, M. "Secure Software Distribution" IEEE Network Operations and Management Symposium, vol. 2, Feb. 14-18, 1994, pp. 486-496.

Van Schyndel, R.G., et al., "A Digital Watermark" IEEE, Australia, 1994, pp. 86-90.

Medvinsky, Gennady et al., "NetCash: A design for practical electronic currency on the Internet" UNiversity of Southern California Information Science Institute, Nov. 1993, pp. 2-7.

Lennil, P. "The IBM Microkernel Technology," OS/2 Developer, vol. 5, Nov. 1, 1993 (pp. 70-72, 74) XP000672962.

Seki, Kazunori et al., "A Proposal of a New Distribution Scheme for Software Products", Jeio Department of Instrumentation Engineering, Faculty of Science and Technology, Keio University, Research report made at the information Processing Association, Japan, Jul. 20, 1993, vol. 93, No. 64, pp. 19-28.

Vigari, J. "A Device for Real-Time Modification of . . . " 18th International Television Symposium and Technical Exhibition, Montreaux, Switzerland, Jun. 10-15, 1993, pp. 761-768.

Neuman, Clifford B., Proxy-Based Authorization and Accounting for Distributed System, Proceedings of the 13th International Conference on Distributed Computing Systems, May 1993, pp. 283-291.

Harn, Lein, et al., "Software Authentication System for Information Integrity" Computers & Security International Journal Devoted to the Study of Technical and Financial Aspects of Computer Security, vol. II, Dec. 1, 1992, pp. 747-752, XP000332279.

Anonymous, "Encryption of Information to be Recorded so as to Prevent Unauthorized Playback" Research Disclosure No. 335, Mar. 1992, Emsworth, GB, p. 219.

U.S. Appl. No. 08/895,493, filed Jul. 16, 1997, Saito.

U.S. Appl. No. 08/846,661, filed May 1, 1997, Saito.

Masuoka, Fujio, 'Progressing Flash Memories Kogyo Chosa-kai Co., Chapter 1: Semiconductor Memory, pp. 34-68.

Tatsuaki Okamoto, "Universal Electronic Cash", Technical Report of Institute of Electronics, Information and Communication Engineers (IEICE) Jul. 15, 1991, vol. 91, No. 127, pp. 39-47.

Komatsu, Naohisa, et al., "A Proposal on Digital Watermark in Document Image Communication and its Application to Realizing a Signature" Electronics & Communications in Japan Part 1 - Communications, vol. 73, No. 5, part I, May 1, 1990, pp. 22-23.

U.S. Appl. No. 08/733,504, filed Oct. 18, 1996, Saito.

Matsumoto, Tsutomu et al., "Cryptographic Key Sharing" Technical Report of Institute of Electronics, Information and Communication Engineers (IEICE), Mar. 27, 1990, vol. 89, No. 482, pp. 33-47.

Morizaki, H., "Introduction to Electronic Devices" Gijustsu Hyoron Publishing Co., 1989, pp. 260-266.

Gale, Brent et al., "Satellite and Cable TV Scrambling and Descrambling" Baylin/Gale Production, 2nd Edition, 1986, pp. 163-165.

Grampp, F.T. et al., "Unix Operating System Security" AT&T Bell Laboratories Technical Journal, vol. 63, No. 8, Oct. 1984, New York, pp. 1649-1672.

Adachi, R., "Introduction to handcraft of Personal Computer" Natsume Publishing Co., 1983, pp. 141-155.

"Des Modes of Operation" U.S. FIPS Publication 81, Dec. 2, 1980, 23 pgs.

U.S. Appl. No. 11/701,943, filed Feb. 1, 2007, Saito.

U.S. Appl. No. 11/701,945, filed Feb. 1, 2007, Saito.

U.S. Appl. No. 11/701,946, filed Feb. 1, 2007, Saito.

Ohtaki, Yasuhiro et al., "Cryptographic Management for Superdistribution" Technical Research Report of Electronic Information Communication Association, Mar. 8, 1991, vol. 90, No. 460, pp. 33-42.

Kent, Stephen T., "Internet Privacy Enhanced Mail", Association for Computing Machinery, Communications of the ACM, Aug. 1993, vol. 36, issue 9, pp. 48-61.

Tirkel, A.Z. et al., "Electronic Water Mark", Conference Proceedings Dicta, Dec. 1993, pp. 666-673.

* cited by examiner

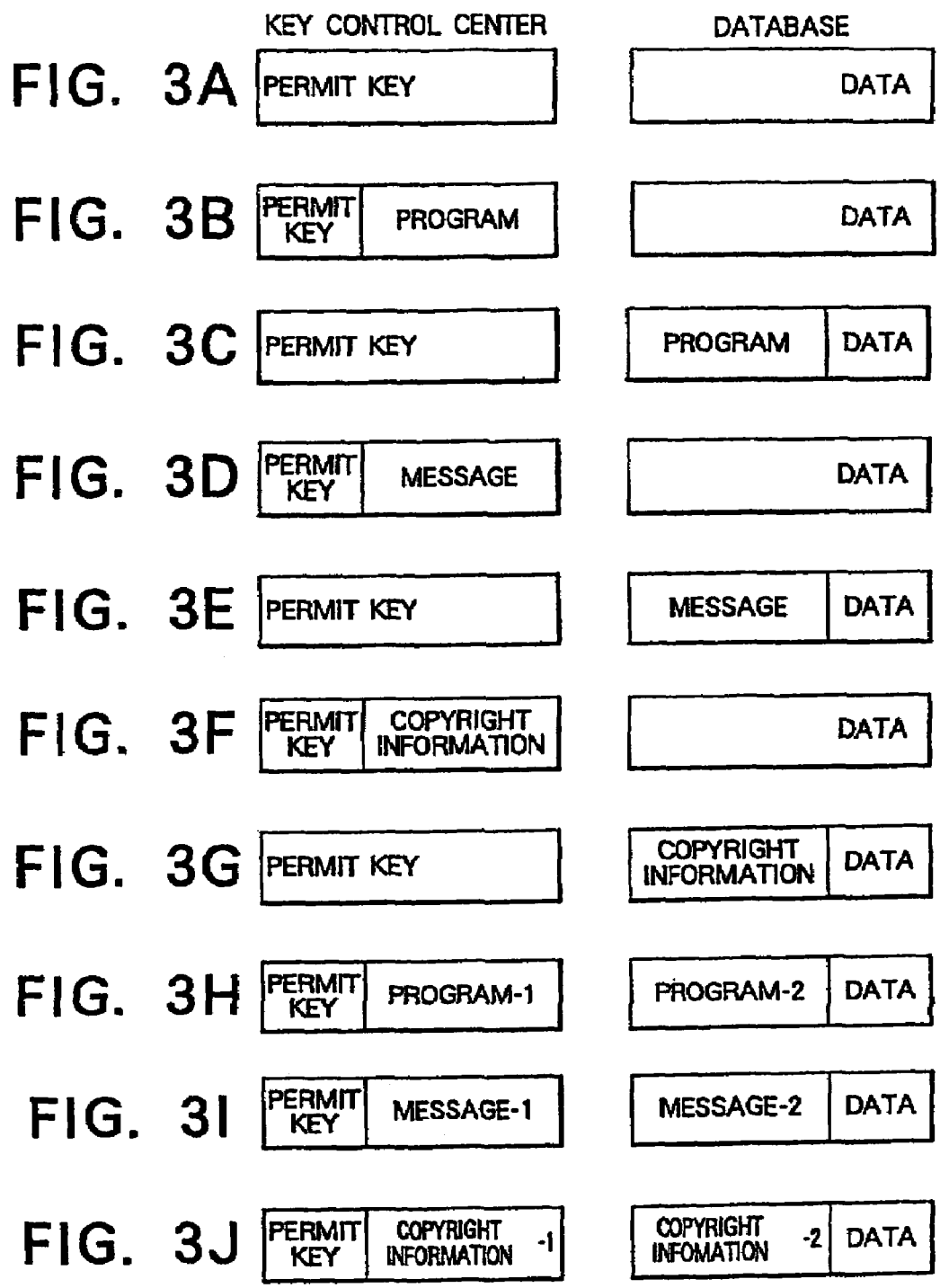

METHOD FOR CONTROLLING DATABASE COPYRIGHTS

This application is a Continuation of prior application Ser. No. 09/544,497 filed Apr. 7, 2000, now U.S. Pat. No. 7,036,019 which is a Continuation of prior application Ser. No. 08/895,493 filed Jul. 16, 1997, which is a Continuation of prior application Ser. No. 08/416,037 filed Mar. 31, 1995, which has been abandoned.

BACKGROUND OF THE INVENTION

1. Field of the Invention

The present invention relates to a method and apparatus for digital data management, and in particular to decrypting digital data.

2. Background Art

In the information oriented society of today, database systems are becoming wide spread in which it is possible to use various types of data, stored independently by each computer in the past, by connecting computers via communication lines.

In such a database system, the information handled up to this point has been conventionally coded information that can be processed by computer, and that contains a relatively small amount of information and monochrome binary data, such as facsimile information at the most. It is not possible to handle data containing a relatively large amount of information, such as data for natural pictures or animation.

With the rapid progress of digital processing techniques for various types of electrical signals, a technique is under development for digital processing of picture signals other than binary data, handled only as analog signals in the past.

By digitizing the picture signal, it is possible to handle a picture signal, such as television signal, by computer. As a technique of the future, attention is now focused on "multimedia systems", which can simultaneously handle the data processed by computers and digitized picture data. Because the picture data contains an overwhelmingly large amount of information compared with character data and audio data, it is difficult to store, transfer or process the picture data by computer. For this reason, techniques for compressing and expanding picture data have been developed. Further, several standards for compression/expansion of picture data have been established. For example, the following standards have been established as common standards: JPEG (Joint Photographic image coding Experts Group) standards for still pictures, H.261 standards for television conferences, MPEG1 (Moving Picture image coding Experts Group 1) standards for picture accumulation, and MPEG2 standards to cope with current television broadcasting and high definition television broadcasting. By implementing these new techniques, it is now possible to transmit digital picture data in real time.

For analog data, which has been widely used in the past, the control of copyrights during processing has not been an important issue because the quality of the analog data deteriorates each time the data is stored, copied, edited or transferred. However, the quality of digital data does not deteriorate even when the data is repeatedly stored, copied, edited or transferred. Therefore, the management and control of copyrights during processing of digital data is an important issue.

Up to now, there has been no adequate method for management and control of copyrights for digital data. It has been managed and controlled merely by copyright law or by contracts. In copyright law, only compensation for digital sound and picture recording devices has been prescribed.

It is possible not only to refer to the content of a database, but also to effectively utilize the data obtained from the database by storing, copying or editing the data, and also transferring the edited data to other persons or to the database with the edited data registered as new data.

In a conventional database system, only character data is handled. However, in multimedia systems, sound data and picture data, which are originally analog data, are digitized and used as part of the database in addition to the other data in the database, such as character data.

Under such circumstances, it is an important question as to how to handle copyrights of the data in the database. However, there are no means in the prior art for copyright management and control of such actions as copying, editing, transferring, etc., of data.

A system for executing copyright control by using encrypted data and obtaining a permit key from a key control center via public telephone lines is disclosed in Japanese Patent Application 4-199942 (U.S. Ser. No. 08/098,415) and Japanese Patent Application 4-289074 (U.S. Ser. No. 08/143,912) of the present inventors. A device for this purpose is disclosed in Japanese Patent Application 4-276941 (U.S. Ser. No. 08/135,634), also of the present inventors.

SUMMARY OF THE INVENTION

It is an object of the present invention to provide a method for controlling copyrights in the display (including the process of providing sound), storage, copying, editing and transfer of digital data in a database system including real time transmission of digital pictures.

For the control of copyrights in the database system to which the present invention is applied, it is essential to transmit one or more "control messages with copyright information" and insert of copyright information; ie., messages of copyright control, information about copyrights and a program for controlling copyrights, when necessary, in addition to a key for enabling users who wish to use encrypted data.

The copyright control message is displayed on a screen and advises or warns the user if the data is being utilized in a manner inconsistent with the conditions of the user's request or permission. The copyright control program watches and controls data use so that the data is not utilized beyond the conditions of the user's request or permission.

The copyright control program, the copyright information and the copyright control message are supplied together with a permit key in some cases, but they may also be supplied together with data in other cases. It is also possible to supply a part of them together with the permit key, and to supply the other part with the data.

For the data, the permit key, the copyright control message, the copyright information and the copyright control program, there are the following three cases: they are transmitted in encrypted form and decrypted upon use; they are transmitted in encrypted form and decrypted only when they are displayed; or they are not encrypted at all.

BRIEF DESCRIPTION OF THE DRAWINGS

FIG. 3A to FIG. 3J illustrate embodiments of the present invention.

DETAILED DESCRIPTION

In the following, description will be given on embodiments of the present invention.

In the prior patent applications mentioned above, it is assumed that a permit key obtaining route is different from a data obtaining route as shown in FIG. 3A, and that the permit key is obtained from a key control center via public telephone lines. However, if a charging method is determined, it is possible to obtain the permit key via the communication system through which the database is supplied.

In the system of the prior patent applications, it is assumed that the permit key for secondary exploitation is used for distribution of the data selected for secondary exploitation. Secondary exploitation involving the storing, copying, editing, transferring, etc. of data is not included in the assumption. Also, it is assumed that the data is distributed only inside a LAN to which the users belong. Distribution outside the LAN is not part of the assumption. Therefore, the system is not adequate to cope with secondary exploitation unless the users choose to honor the copyright.

Figure 4A:
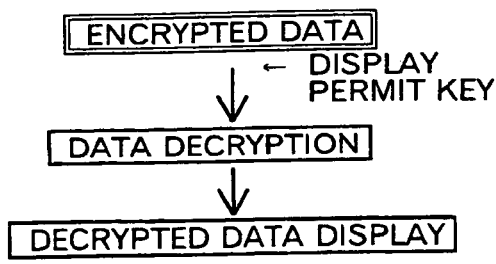
FIGS. 4A–4E illustrate structures of embodiments of the present invention.
Figure 4B:
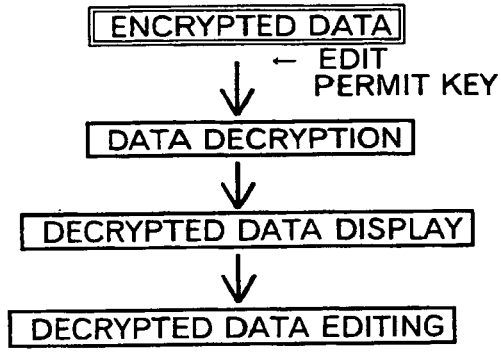
Figure 4C:
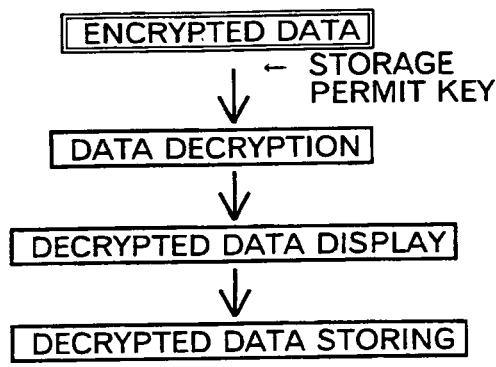
Figure 4D:
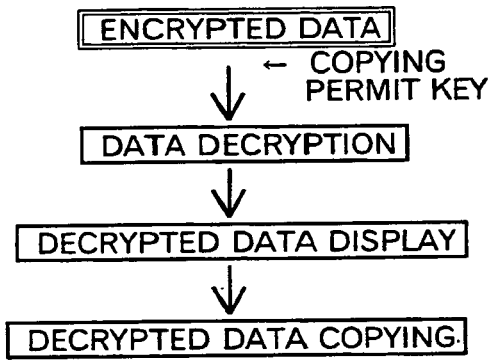
Figure 4E:
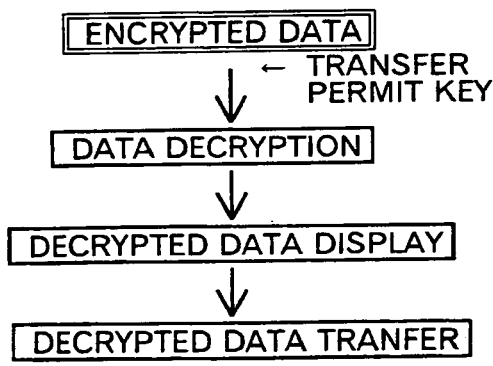

To cope with various forms of the secondary exploitation as described above, a plurality of permit keys are prepared to match each form of use, and no utilization is possible unless there is a permit key suitable for the desired form of use. As to the forms of use available for a database, there are display, storage, copying, edit, transfer, etc. Examples of these utilization forms as shown in FIGS. 4A to 4E. FIG. 4A illustrates a case when supplied encrypted data is displayed. The encrypted data is decrypted by a display permit key, and the data thus decrypted is displayed. FIG. 4B illustrates a case when supplied encrypted data is edited. The encrypted data is decrypted by an edit permit key, and the data thus decrypted is displayed, and then editing is performed. FIG. 4C illustrates a case when supplied encrypted data is stored. The encrypted data is decrypted by a storage permit key, and the data thus decrypted is displayed, and then storing is performed. FIG. 4D illustrates a case when supplied encrypted data is copied. The encrypted data is decrypted by a copy permit key, and the data thus decrypted is displayed, and then copying is performed. FIG. 4E illustrates a case when supplied encrypted data is transferred. The encrypted data is decrypted by a transfer permit key, and the data thus decrypted is displayed, and then transfer is performed. In these Figures, double-framed parts show that data is encrypted. The permit keys suitable for these forms of use should be prepared. However, in the case where the ability to execute several forms of use at the same time is desired, it is necessary to obtain a plurality of permit keys. If the user fails to obtain the permit keys, the desired form of use may not be executed.

To avail such situations, a permit key can be used which makes it possible to execute several forms of use. Hierarchical permit keys can be used such that an upper level key also fulfills the function of a lower level key. For example, from lower level to upper level the hierarchy is defined as: display<storage<copying<edit<transfer. With the display permit key, only display operations can be executed. Display and storage operations can be executed by the storage permit key. Display, storage and copying operations can be executed by the copying permit key. Display, storage, copying and edit operations can be executed by the edit permit key. Display, storage, copying, edit and transfer operations can be executed by the transfer permit key.

In the prior patent application, i.e. Japanese Patent Application 4-276941 (U.S. Ser. No. 08/135,634), the present inventors have proposed a system in which a plurality of encrypted data each encrypted by a plurality of different crypt keys, are recorded (stored) in encrypted form. The data is decrypted when it is utilized, in the system where the storage permit key is the lowest level key.

By applying this system, it is possible to order key hierarchy from lower-level to upper-level in the order of storage<copying<transfer<display<edit. Specifically, the order is set in such manner that storage operations can be executed by a storage permit key; storage and copying operations can be executed by a copying permit key; storage, copying and transfer operations can be executed by a transfer permit key; storage, copying, transfer and display operations can be executed by a display permit key; and storage, copying, transfer, display and edit operations can be executed by an edit permit key.

In this system, storage, copying and transfer are placed at a lower level than display because, even when storage, copying and transfer operations are executed on the data, it is difficult and meaningless to utilize the data since it cannot be displayed. It is necessary to execute display in order to utilize the data. This hierarchical arrangement is best suited to a system, in which encrypted data are supplied and are utilized using a permit key.

The permit key is usually offered to the user on payment basis. Therefore, except where data utilization is unlimited, the number of times the permit key may be used is limited to one time or several times if it is necessary to limit the number of times the data is used.

Because the data can be used if there is a permit key, it is possible to use the data beyond the permitted range if the permit key is duplicated or falsified. To prevent this, the permit key is encrypted.

The use of data includes storage, display, copying, edit, transfer, etc. thereof, which are necessary to be allowed or prohibited.

In the case where it is necessary to limit the number of usage times or to limit forms of use, it is desirable to display a message for such purpose.

In the case where the information under copyright is falsified, the data supplier or the user may suffer damages. This must be prevented.

To ensure complete copyright control, information on the original copyright and information on secondary and tertiary copyrights for the edition of the data are given to the data.

The above copyright control is executed by the copyright control program.

In a conventional database system, the data itself is offered in a completely defenseless state. Therefore, copyright control can be executed only when data is taken out of the database. In the subsequent copyright control, there is no other way but to rely on conscience of the user and to take necessary measures when the data is utilized beyond the permitted range of use.

For this reason, as described in the prior patent application, i.e. Japanese Patent Application 4-276941 (U.S. Ser. No. 08/135,634), the data supplied from the database are left in an encrypted state, and storage is executed under this condition. In addition, copying and transfer are also executed in the encrypted state. Decrypting is performed only in display and edit operations, and these are controlled by the copyright control program. These examples are shown in FIGS. 5A to 5E.

Figure 5A:
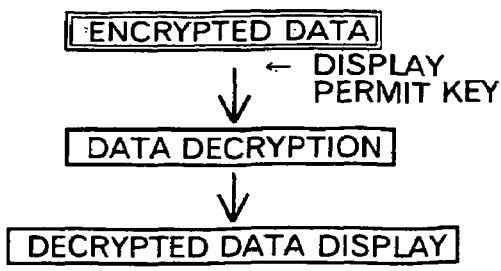
FIGS. 5A–5E illustrate structures of embodiments of the present invention.
Figure 5B:
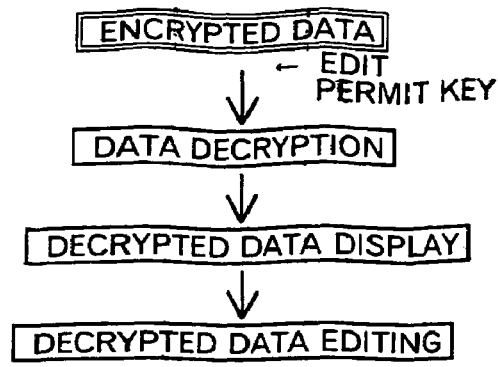
Figure 5C:
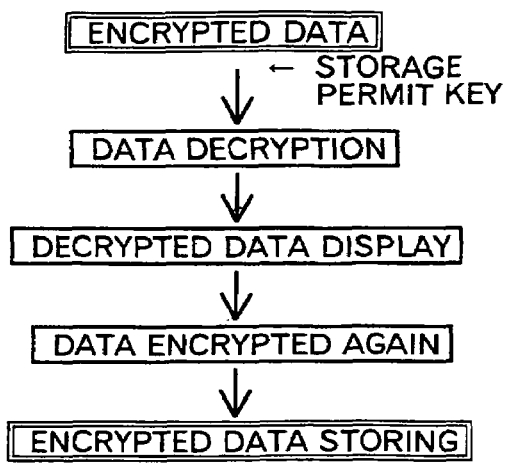
Figure 5D:
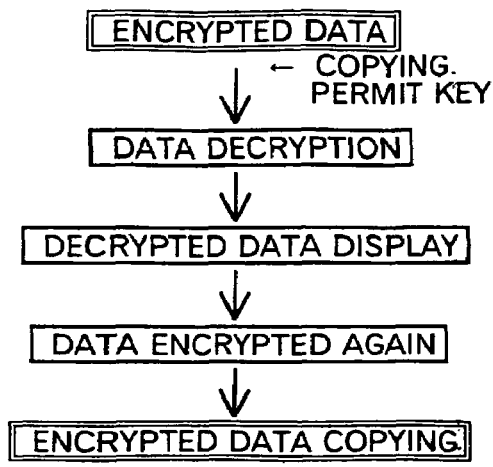
Figure 5E:
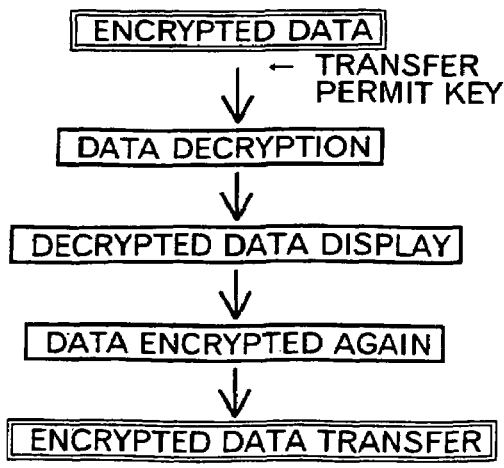

FIG. 5A illustrates a case when supplied encrypted data displayed. The encrypted data is decrypted by a display permit key, and the data thus decrpyted is displayed. FIG. 5B illustrates a case when supplied encrypted data is edited. The encrypted data is decrypted by an edit permit key, and the data thus decrypted is displayed, data is decrypted by a storage permit key, and the data thus decrypted is displayed, and then, the decrypted data is encrypted again by the storing permit key, and then storing is performed. Thus, the data encrypted again is stored. FIG. 5D illustrates a case when supplied encrypted data is copied. The encrpted by a copy permit key, and the data thus decrypted is displayed and then, the decrypteddata is encrypted again by the copy permit key, and then copying is performed. Thus, the data encrypted again is copied. FIG. 5E illustrates a case when supplied encrypted data is transferred. The encrypted data is decrypted by a transfer key, and the data thus decrypted is displayed and then, the decrypted data is encrypted data is encrypted again by the transfer permit key, and then transfer is performed. Thus, the data encryption again is transferred. In these Figures, double-framed parts show that data is with encrypted. In so doing, it is impossible to use the data beyond the permitted range. In this case, the copyright control program may be integrated with the data or may be encrypted.

Because the copyright control program is encrypted and the permit key decrypts the copyright control program, and because the copyright control program decrypts and encrypts the data, the data is encrypted twice.

In this case, if a crypt key unique to the data is added to the copyright control program for the purpose of encrypting the data, it is impossible to decrypt the data if the copyright control program is separated from the data.

In this copyright control program, even if the data is stored, copied or transferred within the permitted range of use, and if these operations are executed after the data and the copyright control program have been encrypted, it is impossible to use the data in an undesired manner.

If an operator uses a computer program inadequately and, as a result, the computer does not respond any more or computer operation is stopped, an error message is displayed so that the operator may know the cause. Similarly, if a user of the database erroneously uses the data beyond the permitted range of the permit key, and, as a result, the computer does not respond or operation is stopped, the user cannot understand the cause. In this case, a copyright control message is displayed just as an error message is displayed by the copyright control program.

The display of the copyright control message as described above also fulfills the function of providing a warning if the user intentionally uses the data beyond the range of use permitted by the permit key.

In general, various programs are incorporated into read-only memory (ROM) inside the equipment which the user uses, or the programs are supplied from software. When the programs are incorporated into ROM, there is no possibility that the programs may be changed. However, the equipment to be used is limited to systems that contain the ROM. On the other hand, when the programs are supplied from software, there is no system limitation if the programs are transferred. However, there is a possibility that the programs may be altered.

The database is utilized by various users using various types of devices. Therefore, if the programs for controlling copyrights are supplied as software, it is necessary to cope with various types of devices. Further, alteration of the programs must not be possible. Therefore, the copyright control program should be encrypted to prevent such trouble. In this case, it is necessary to modify the program according to the device that the user uses. A program to translate the copyright control program is provided in the communication software of the device which the user uses. The copyright control program can then be translated by the translation program so that it suits the device.

Even though the permit key for using the database may become more complicated due to encryption, a data size of several tens of bites is sufficient. Therefore, the time required for transmitting the permit key is far shorter than one second. In other words, even when a payment-based public telephone line is used and other information is transmitted together with the permit key, the increase of cost is negligible.

Therefore, when transmitting the permit key as shown in FIG. 3B, utilizing surplus time, the copyright control program can be transmitted.

The copyright control program can be supplied together with the permit key and also together with the data as shown in FIG. 3C.

In this case, the copyright control program is supplied together with the data, and the entire data utilization process is placed under control of the copyright control program. For example, the data supplied in encrypted form cannot be decrypted unless the copyright program supplied with it is used. If there is no such copyright control program, the data cannot be used. Thus, the control of copyrights is reinforced. Also, integration of the copyright control program with the data further reinforces copyright control.

The following are some examples of the copyright control message:

"Need a display permit key."
"Need a storage permit key."
"Need a copying permit key."
"Need an edit permit key."
"Need a transfer permit key."

Some other examples are:

"Display unavailable."
"Storage unavailable."
"Copy unavailable."
"Edit unavailable."
"Transfer unavailable."

Figure 1A:
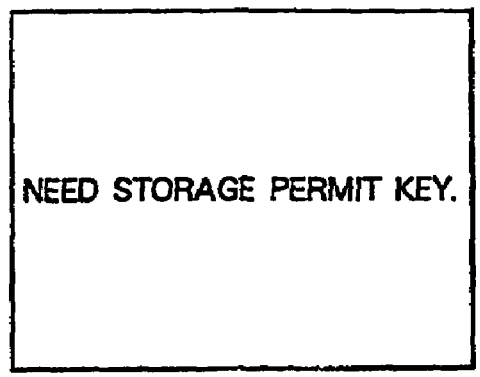
FIG. 1A and FIG. 1B illustrate examples of display messages of the present invention.
Figure 1B:
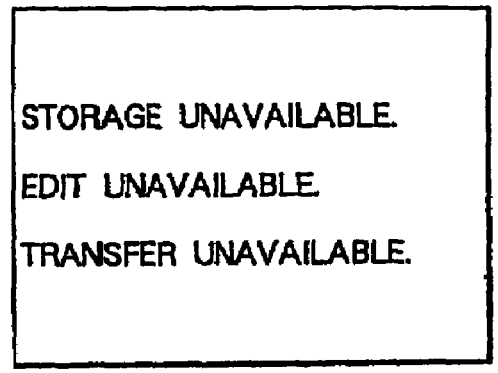

These copyright control messages are displayed alone as shown in FIG. 1A or in combination as shown in FIG. 1B.

Next, description will be given on supply of the copyright control message.

To display the copyright control message, the message must be stored in the memory of the device which the user uses. The memory in the device is classified as ROM and random-access memory (RAM).

The method of storing the messages in ROM is reliable, but there is a limitation to the device because the user must use the ROM wherein the copyright control messages are stored.

As for methods for storing messages in RAM, there is a method for supplying messages together with the permit key, a method for supplying messages together with the copyright control program, and a method for supplying messages together with the data. When the permit key and the copyright control program are supplied at the same time, the copyright control message can also be supplied at the same time.

The copyright control message is not effective unless an adequate message is displayed. For this reason, the copyright control message cannot play its designed role if the message is changed in such a manner that no substantial content is displayed, or further, if its content is deleted such that nothing is displayed. To prevent this trouble, the message is encrypted.

The display of the copyright control message is executed by the copyright control program. The modes of display are as follows. (1) When an operation is attempted with no adequate key available, a corresponding message is displayed. (2) All messages corresponding to operations available for the current permit key are displayed, if an operation is attempted without an available permit key.

The copyright control message is supplied together with the permit key as shown in FIG. 3D, or together with the data as shown in FIG. 3E.

The copyright control message is transmitted by transmitting all messages or only the necessary messages required. In the former case, the quantity of information is relatively large, but security is high. In the latter case, the quantity of information is relatively small, but security is low.

It is desirable that the copyright control message be inseparable from the data, as in the case of the copyright control program. This may be facilitated by integrating the copyright control message with the copyright control program.

To display the copyright on printed matter, the name of the author and the date are used. The copyright of the database is displayed by entering information such as the name of the author and the date.

As described above, edit and up-load of edited data are included in the use of the data in the database. Specifically, the presence of secondary data, which is edited from the data, i.e. a work of authorship, is recognized. To ensure the copyright of the data in this context, it is necessary to store the information on original authorship and secondary authorship together with the data. In case the data is used in a manner other than for down-loading and display, copyright information including information on the operator, in addition to the copyright information stored up to that moment, is stored together with the data as history.

In this case, only the person who controls the database can put the original authorship into the database as primary data. All data handled by other than the person in charge of database control is considered secondary data. Control of the data history is therefore further reinforced.

When the copyright information is separated from data which is a work of authorship, it becomes extremely difficult to recognize the copyright. Thus, it is necessary that the copyright information be inseparable from the data.

To prevent separation of the copyright information from the data, a method for integrating the data with the copyright information or a method for making the data unusable without copyright information are described. These methods are similar to the methods described above for the copyright control program and the copyright control message.

First, description will be given for a method for integrating the data with the copyright information.

The data handled by computer comprises a file header indicating data name and size, and a file body, which comprises the main body of data. Therefore, for integrating the data with the copyright information, there are methods that integrate the copyright information with the file header, that integrate the copyright information with the file body, and that take other means for the purpose.

Among these methods, the method that integrates the copyright information with file header, if the data is character information expressed with the character code, is available even without a file header. Thus, the method is simple, but not very reliable. Also, because the capacity of the file header is not high, it is not sufficient if there is a large is a large amount copyright information.

Digital picture data and digital sound data are grouped together under a common group header. The copyright information can be integrated into this group header. However, there is a problem of header capacity similar to the case for the file header.

For the method of integrating the copyright information with the file body, one way is to add copyright information for each piece of data edited. Another way is to add the copyright information all together.

To add the copyright information for each piece of data, edited the copyright information is added to each piece of data which is edited by a cut-and-paste procedure and produced. This is not only complicated but disadvantageous in that the entire file data becomes too big.

If the picture data indicates the copyright of original authorship, it is easy to identify corresponding data. Thus, it is not always necessary to add the copyright information to each minimum unit of the edited data.

It is also possible to write the copyright information into the copyright control program. In this method, it is difficult to manipulate the copyright information if it is written into the copyright control program integrated with the data as already described.

If the data is a picture signal, it is necessary to have synchronization signal data in order to define scanning line, field and frame. This synchronization signal has high redundancy and is generally represented with variable-length code. Thus, the copyright information can be mixed with the variable-length code. The number of scanning lines is 480 for VGA standards. By utilizing this method, a considerable quantity of information can be mixed into it.

In case the picture data is an animated picture, it is possible to write a sufficient quantity of copyright information in this method. However, if the picture data is a still picture edited by a cut-and-paste procedure, there may not be enough space to add the copyright information.

Figure 2A:
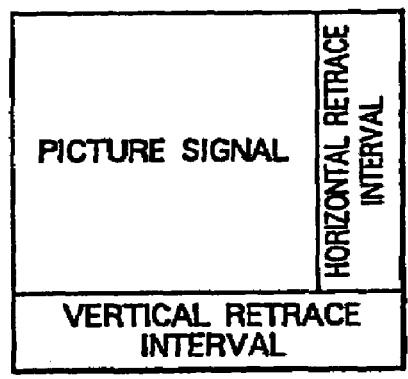
FIG. 2A and FIG. 2B illustrate structures for television signals.
Figure 2B:
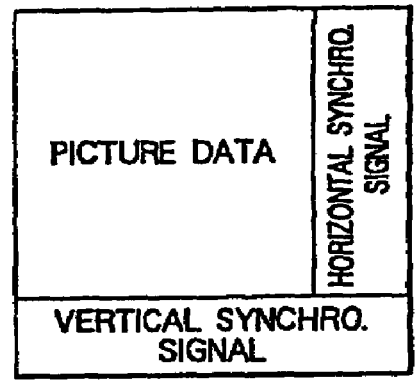

FIG. 2A and FIG. 2B represent structures for an analog television signal and a digital television signal. FIG. 2A represents an analog television signal, and FIG. 2B shows a digital television signal.

A signal containing other than picture data, such as the multiplex teletext signal in analog television, is inserted by utilizing the vertical retrace interval. The horizontal retrace interval is not utilized.

In contrast, in digital television, it is possible for a copyright control program or other multiplex teletext signal to be placed into horizontal scanning data or into vertical scanning data.

As a method for integrating the copyright information with data, one way is to write the copyright information into the data itself, and another is to write it into control code.

With the data used in computer, there is control code for controlling the communication system or computer system in addition to the data to be displayed on screen or used for some operations. This control code cannot be seen by the user. Therefore, if the copyright information is written into the control code, the copyright information thus written does not cause trouble for the user.

It is also possible to enter the copyright information into the files of the computer using the technique of a computer virus without affecting the operation itself.

The copyright information may be supplied together with the permit key as shown in FIG. 3F or may be supplied together with data as shown in FIG. 3G.

Attention has been focused in recent years on digital signatures. Using a private key, which only the person concerned knows, and a public key, which other persons also know, a digital signature is prepared from the private key and from the data on the file size of the document data. If the document data is changed, the change can be confirmed by the private key, and the content of the document data can be seen at any time by other persons using the public key. Thus, this scheme offers very high security.

The data in a computer can be changed without leaving any trace. Because of this, an author may not notice that his copyright is infringed, or a user may use the data without knowing that the content of the data has been changed, and the author or user may suffer damages. To prevent this, a digital signature is attached to the data, and damage to the copyright owner or the user can be avoided.

The permit key, copyright control program, copyright control message, and copyright information can be combined in any way as necessary to actualize the method for controlling database copyrights.

Also, it is possible to design in such a manner that only a part of the data of the copyright control program, the copyright control message or the copyright information is supplied together with the permit key as shown in FIGS. 3H, 3I and 3J, and that the other part is supplied together with the data to be utilized. The part supplied with the permit key and the part supplied together with the data are then combined, and functions the of the complete permit key maybe served after they have been combined together.

Thus, it is possible to give the function of the permit key to the copyright program and copyright control message, and higher security is ensured.

What we claim is:

1. A digital data management apparatus, comprising:
an input device configured to receive encrypted digital data and a permit key;
a first means for decrypting the encrypted digital data and for performing a set of functions, wherein the set of functions includes displaying, editing, storing, copying, and transferring said digital data,
wherein the first means is configured to authorize a user to display the decrypted digital data in response to the permit key having a value indicating that the user has display authorization,
wherein the first means is configured to authorize the user to edit the decrypted digital data in response to the authorize key having a value indicating that the user has edit authorization,
wherein the first means is configured to authorize the user to store a re-encrypted version of the decrypted digital data in response to the authorize key having a value indicating that the user has storage authorization,
wherein the first means is configured to authorize the user to copy a re-encrypted version of the decrypted digital data in response to the authorize key having a value indicating that the user has copy authorization,
wherein the first means is configured to authorize the user to transfer a re-encrypted version of the decrypted digital data in response to the authorize key having a value indicating that the user has transfer authorization.

2. The digital data management apparatus of claim 1, wherein the functions of said set are arranged in a hierarchy, wherein the first means is configured to automatically grant the user authorization for any function lower in the hierarchy than a given function whose authorization is indicated by the permit key.

3. The digital data management apparatus of claim 2, wherein said function of transferring is at the highest level of said hierarchy.

4. The digital data management apparatus of claim 2, wherein said function of editing is at the highest level of said hierarchy.

5. The digital data management apparatus of claim 1, wherein the first means is configured to manage utilization of the digital data, wherein said management includes selectively granting authorization for one or more of said displaying, said editing, said storing, said copying and said transferring based on the permit key.

6. The digital data management apparatus of claim 1, wherein the first means is configured to determine whether the decrypted digital data includes copyright information.

7. The digital data management apparatus of claim 6, wherein said copyright information includes original copyright information and edit copyright information added to said digital data by a copyright management program.

8. The digital data management apparatus of claim 6, wherein said copyright information must be present in order to use said decrypted digital data.

9. A computer readable storage medium having stored thereon program instructions, wherein the program instructions are executable by a computer system to:
receive encrypted digital data and a permit key;
decrypt the encrypted digital data;
grant a user authorization to display the decrypted digital data in response to the permit key having a value indicating that the user has display authorization;
grant the user authorization to edit the decrypted digital data in response to the permit key having a value indicating that the user has edit authorization;
grant the user authorization to store re-encrypted version of the decrypted digital data in response to the permit key having a value indicating that the user has storage authorization;
grant the user authorization to copy re-encrypted version of the decrypted digital data in response to the permit key having a value indicating that the user has copy authorization;
grant the user authorization to transfer a re-encrypted version of the decrypted digital data in response to the permit key having a value indicating that the user has transfer authorization.

10. The computer readable storage medium of claim 9, wherein functions including said displaying, said editing, said storing, said copying and said transferring are arranged in a hierarchy, wherein the granting of authorization to perform a given one of said functions automatically implies the granting of authorization to perform any functions in said hierarchy that are subordinate to said given function.

11. The computer readable storage medium of claim 10, wherein said function of transferring is at the highest hierarchy level.

12. The computer readable storage medium of claim 10, wherein said function of transferring is at the highest hierarchy level.

13. The computer readable storage medium of claim 9, wherein the instructions include a program for managing utilization of said digital data, wherein said managing utilization include controlling the granting of authorization for said displaying, said editing, said storing, said copying and said transferring to the user based on the permit key.

14. The computer readable storage medium of claim 13, wherein a first portion of the program instructions is executable by the computer system to receive the program with the encrypted digital data and/or with the permit key.

15. The computer readable storage medium of claim 9, wherein copyright information is received with said encrypted digital data and/or said permit key.

16. The computer readable storage medium of claim 15, wherein said copyright information includes original copyright information and edit copyright information added to said digital data by a copyright management program.

17. The computer readable storage medium of claim 15, wherein said copyright information must be present in order to use said decrypted digital data.

18. An apparatus, comprising:
a computing platform, said computing platform adapted to:
 receive encrypted digital data and a permit key;
 decrypt the encrypted digital data;
 grant a user authorization to display the decrypted digital data in response to the permit key having a value indicating that the user has display authorization;
 grant the user authorization to edit the decrypted digital data in response to the permit key having a value indicating that the user has edit authorization;
 grant the user authorization to store a re-encrypted version of the decrypted digital data in response to the permit key having a value indicating that the user has storage authorization;
 grant the user authorization to copy a re-encrypted version of the decrypted digital data in response to the permit key having a value indicating that the user has copy authorization;
 grant the user authorization to transfer a re-encrypted version of the decrypted digital data in response to the permit key having a value indicating that the user has transfer authorization.

19. The apparatus of claim 18, wherein said functions including said displaying, said editing, said storing, said copying and said transferring are arranged in a hierarchy, wherein the granting of authorization to perform a given one of said functions automatically implies the granting of authorization to perform any functions in said hierarchy that are subordinate to said given function.

20. The apparatus of claim 19, wherein said function of transferring is at the highest level of said hierarchy.

21. The apparatus of claim 19, wherein said function of editing is at the highest level of said hierarchy.

22. The apparatus of claim 18, wherein said computing platform is further adapted to use a copyright management program for managing utilization of said digital data, wherein said managing of utilization includes controlling the granting of authorization for said displaying, said editing, said storing, said copying and said transferring based on the permit key.

23. The apparatus of claim 22, wherein said computing platform is further adapted to receive said copyright management program with said permit key and/or with said encrypted digital data.

24. The apparatus of claim 18, wherein said computing platform is further adapted to receive copyright information with said encrypted digital data.

25. The apparatus of claim 24, wherein said copyright information includes original copyright information and edit copyright information, wherein the edit copyright information is added to said decrypted digital data by a copyright management program.

26. The apparatus of claim 24, wherein said computing platform is further adapted to:
 determine whether said copyright information is present; and
 deny use of said digital data if the copyright information is not present.

27. A method for digital data management, the method comprising:
 receiving a request for digital data, wherein the request is received from a first computer system;
 in response to the request, providing to the first computer system an encrypted version of the digital data and a permit key, wherein the permit key corresponds to a user of the first computer system and has one a plurality of privilege levels, wherein the plurality of privilege levels includes at least five privilege levels;
 wherein the permit key is usable on the first computer system to authorize the decryption and display of the digital data if the permit key has a first privilege level;
 wherein the permit key is usable on the first computer system to authorize decrypting and editing of the digital data if the permit key has a second privilege level;
 wherein the permit key is usable on the first computer system to authorize storing of an encrypted version of the digital data if the permit key has a third privilege level;
 wherein the permit key is usable on the first computer system to authorize of an encrypted version of the digital data if the permit key has a fourth privilege level;
 wherein the permit key is usable on the first computer system to authorize transferring of an encrypted version of the digital data if the permit key has a fifth privilege level.

28. The method of claim 27, wherein the plurality of privilege levels are arranged in a hierarchy, wherein authorization to use the digital data at a given level of the hierarchy automatically implies authorization to use the digital data any lower levels of the hierarchy.

29. The method of claim 28, wherein said fifth privilege level is a highest level of said hierarchy.

30. The method of claim 28, wherein said second privilege level is a highest level of said hierarchy.

31. The method of claim 27, further comprising: sending the digital data to the first computer system, wherein the digital data is sent in an encrypted form.

32. The method of claim 27, further comprising: generating the permit key in response to the user marking a payment for the permit key.

33. The method of claim 27, further comprising: sending copyright information to the first computer system with the digital data or with the permit key.

34. The method of claim 27, further comprising:
 sending a copyright management program to the first computer system, wherein the copyright management program is configured to execute on the first computer system and to control granting of authorization at one or more of said authorization levels based on the permit key.

35. A computer system comprising:
a processor; and
a memory that stores at least program instructions, wherein the program instructions are executable by the processor to:

receive a request for digital data, wherein the request is received from a remote computer system;

in response to the request, provide to the remote computer system an encrypted version of the digital data and a permit key, wherein the permit key corresponds to a user of the remote computer system and has one a plurality of privilege levels, wherein the plurality of privilege levels includes at least five privilege levels;

wherein the permit key is usable on the remote computer system to authorize the decryption and display of the digital data if the permit key has a first privilege level;

wherein the permit key is usable on the remote computer system to authorize decrypting and editing of the digital data if the permit key has a second privilege level;

wherein the permit key is usable on the remote computer system to authorize storing of an encrypted version of the digital data if the permit key has a third privilege level;

wherein the permit key is usable on the remote computer system to authorize copying of an encrypted version of the digital data if the permit key has a fourth privilege level;

wherein the permit key is usable on the remote computer system to authorize transferring of an encrypted version of the digital data if the permit key has a fifth privilege level.

36. The computer system of claim 35, wherein the plurality of privilege levels are arranged in a hierarchy, wherein authorization to use the digital data at a given level of the hierarchy automatically implies authorization to use the digital data any lower levels of the hierarchy.

37. The computer system of claim 36, wherein said fifth privilege level is a highest level of said hierarchy.

38. The computer system of claim 36, wherein said second privilege level is a highest level of said hierarchy.

39. The computer system of claim 35, wherein the program instructions are executable by the processor to send the digital data to the remote computer system, wherein the digital data is sent in an encrypted form.

40. The computer system of claim 35, wherein the program instructions are executable by the processor to generate the permit key in response to user making a payment.

41. The computer system of claim 35, wherein the program instructions are executable by the processor to send copyright information to the remote computer system, wherein the copyright information corresponds to an author of the digital data.

42. The computer system of claim 35, wherein the program instructions are executable by the processor to:
send a copyright management program to the user, wherein the copyright management program is sent in an encrypted form, wherein the copyright management program is configured to execute on the remote computer system and to control the granting of authorization at one or more of said by authorization levels based on the permit key.

43. A computer-readable memory medium which stores program instructions executable by a computer system to:
receive a request for digital data, wherein the request is received from a remote computer system;

in response to the request, provide to the remote computer system an encrypted version of the digital data and a permit key, wherein the permit key corresponds to a user of the remote computer system and has one a plurality of privilege levels, wherein the plurality of privilege levels includes at least five privilege levels;

wherein the permit key is usable on the remote computer system to authorize the decryption and display of the digital data if the permit key has a first privilege level;

wherein the permit key is usable on the remote computer system to authorize decrypting and editing of the digital data if the permit key has a second privilege level;

wherein the permit key is usable on the remote computer system to authorize storing of an encrypted version of the digital data if the permit key has a third privilege level;

wherein the permit key is usable on the remote computer system to authorize copying of an encrypted version of the digital data of the permit key has a fourth privilege level;

wherein the permit key is usable on the remote computer system to authorize transferring of an encrypted version of the digital data if the permit key has a fifth privilege level.

44. The memory medium of claim 43, wherein the plurality of privilege levels are arranged in a hierarchy, wherein authorization to use the digital data at a given level of the hierarchy automatically implies authorization to use the digital data any lower levels of the hierarchy.

45. The memory medium of claim 44, wherein said fifth privilege level is a highest level of said hierarchy.

46. The memory medium of claim 44, wherein said second privilege level is a highest level of said hierarchy.

47. The memory medium of claim 43, wherein the program instructions are executable by the computer system to send the digital data to the remote computer system, wherein the digital data is sent in an encrypted form.

48. The memory medium of claim 43, wherein the program instructions are executable by the computer system to generate the permit key for a user, wherein the permit key is generated with said privilege level based on a user payment.

49. The memory medium of claim 43, wherein the program instructions are executable by the computer system to send copyright information, corresponding to the digital data, to the remote computer system.

50. The memory medium of claim 43, wherein the program instructions are executable by the computer system to:
send a copyright management program to the user, wherein the copyright management program is configured to execute on the remote computer system and to control the granting of authorization for said displaying, said editing, said storing, said copying and said transferring based on the permit key.

* * * * *

UNITED STATES PATENT AND TRADEMARK OFFICE
CERTIFICATE OF CORRECTION

PATENT NO. : 7,383,447 B2 Page 1 of 1
APPLICATION NO. : 11/190177
DATED : June 3, 2008
INVENTOR(S) : Makoto Saito It is certified that error appears in the above-identified patent and that said Letters Patent is hereby corrected as shown below:

Column 9

Claim 1, Lines 54, 58, 62, 66, please delete "authorize key" and substitute
--permit key--

Column 10

Claim 9, Lines 40, 44, please delete "store re-encrypted version" and substitute
--store a re-encrypted version--

Column 12

Claim 27, Line 31, please delete "system to authorize" and substitute --system to authorize copying--

Claim 35, Line 67, please delete "by the processor to;" and substitute --by the processor to:--

Column 14

Claim 43, Line 23, please delete "of the permit key" and substitute --if the permit key--

Signed and Sealed this

Fifth Day of August, 2008

JON W. DUDAS
*Director of the United States Patent and Trademark Office*